(12) United States Patent
Beverly et al.

(10) Patent No.: US 7,870,268 B2
(45) Date of Patent: Jan. 11, 2011

(54) METHOD, SYSTEM, AND PROGRAM FOR MANAGING DATA TRANSMISSION THROUGH A NETWORK

(75) Inventors: Harlan T. Beverly, McDade, TX (US); Ashish Choubal, Austin, TX (US); Gary Y. Tsao, Austin, TX (US); Arturo L. Arizpe, Wimberley, TX (US)

(73) Assignee: Intel Corporation, Santa Clara, CA (US)

( * ) Notice: Subject to any disclaimer, the term of this patent is extended or adjusted under 35 U.S.C. 154(b) by 1964 days.

(21) Appl. No.: 10/663,026

(22) Filed: Sep. 15, 2003

(65) Prior Publication Data
US 2005/0060442 A1    Mar. 17, 2005

(51) Int. Cl.
G06F 15/16    (2006.01)
(52) U.S. Cl. .................................... 709/228
(58) Field of Classification Search .................. 709/228
See application file for complete search history.

(56) References Cited

U.S. PATENT DOCUMENTS

| | | | |
|---|---|---|---|
| 6,473,793 B1 | 10/2002 | Dillon et al. | |
| 6,711,137 B1 | 3/2004 | Klassen et al. | |
| 6,742,021 B1 | 5/2004 | Halverson et al. | |
| 7,103,683 B2 | 9/2006 | Madukkarumukumana et al. | |
| 2002/0112057 A1 | 8/2002 | Srinivas et al. | |
| 2003/0086407 A1* | 5/2003 | Bhatt et al. | 370/345 |
| 2003/0193893 A1* | 10/2003 | Wen et al. | 370/231 |
| 2004/0049580 A1* | 3/2004 | Boyd et al. | 709/226 |
| 2005/0036511 A1* | 2/2005 | Baratakke et al. | 370/469 |
| 2005/0141425 A1 | 6/2005 | Foulds | |

(Continued)

OTHER PUBLICATIONS

Balakrishnan et al., "TCP Behavior of a Busy Internet Server: Analysis and Improvements", UC Berkeley EECS Technical Reports, CSD-97-966, Aug. 1997, Found at web site: http://techreports.lib.berkeley.edu/accessPages/CSD-97-966.html.*

(Continued)

Primary Examiner—Vivek Srivastava
Assistant Examiner—William J Goodchild
(74) Attorney, Agent, or Firm—Konrad Raynes & Victor LLP

(57) ABSTRACT

Provided are a method, system, and program for managing data transmission from a source to a destination through a network. The destination imposes a window value on the source which limits the quantity of data packets which can be sent from the source to the destination without receiving an acknowledgment of being received by the destination. In one embodiment, the source imposes a second window value, smaller than the destination window value, which limits even further the quantity of data packets which can be sent from the source to the destination without receiving an acknowledgment of being received by the destination. In another embodiment, a plurality of direct memory access connections are established between the source and a plurality of specified memory locations of a plurality of destinations. The source imposes a plurality of message limits, each message limit imposing a separate limit for each direct memory access connection on the quantity of messages sent from the source to the specified memory location of the direct memory access connection associated with the message limit and lacking a message acknowledgment of being received by the destination of the direct memory access connection associated with the message limit.

30 Claims, 9 Drawing Sheets

U.S. PATENT DOCUMENTS

2005/0216597 A1 9/2005 Shah et al.
2007/0038753 A1 2/2007 Jorgensen

OTHER PUBLICATIONS

Misra et al., "The window distribution of idealized TCP congestion avoidance with variable packet loss", INFOCOM '99. Eighteenth Annual Joint Conference of the IEEE Computer and Communications Societies. Proceedings. IEEE vol. 3, Mar. 21-25, 1999 pp. 1564-1572 vol. 3.* von Eicken et al., "Evolution of the virtual interface architecture", Computer vol. 31, Issue 11, Nov. 1998 pp. 61-68.*

Stevens, Richard, "TCP/IP Illustrated, vol. 1 The Protocols", Addison-Wesley professional computing series, ISBN 0-201-63346-9, Chapter 20, 1994.*

Balakrishnan, H., V.N. Padmanabhan, S. Seshan, M. Stemm, and R.H. Katz, "TCP Behavior of a Busy Internet Server: Analysis and Improvements", INFOCOM '98, Proceedings of the Seventeenth Annual Joint Conference of the IEEE Computer and Communications Societies, vol. 1, 1998, pp. 252-262.

First Office Action, Jul. 6, 2007, for Chinese Patent Application No. 200410056658.0, 6 pp.

First Office Action, Aug. 13, 2007, for U.S. Appl. No. 10/746,162, 23 pp.

Held, G., "TCP/IP Professional Reference Guide", 2001, CRC Press LLC, Chapter 5, 10 pp.

Lakshman, T.V., and U. Madhow, "The Performance of TCP/IP for Networks with High Bandwidth-Delay Products and Random Loss", IEEE/ACM Transactions on Networking, vol. 5, No. 3, Jun. 1997, pp. 336-350.

Wright, G.R., and W.R. Stevens, "TCP/IP Illustrated, vol. 2: The Implementation", Sections 22.1 and 26.1, Addison-Wesley Professional, 2002, 5 pp.

"DARPA Internet Program Protocol Specification," Information Sciences Institute, University of Southern California, Sep. 1981; 85 pp.

"Information Technology—SCSI RDMA Protocol (SRP)," T10 Technical Committee; ed. C. Simpson for Intel Corporation, Jul. 2002; 83 pp.

* cited by examiner

METHOD, SYSTEM, AND PROGRAM FOR MANAGING DATA TRANSMISSION THROUGH A NETWORK

BACKGROUND OF THE INVENTION

1. Field of the Invention

The present invention relates to a method, system, and program for managing data transmission through a network.

2. Description of Related Art

In a network environment, a network adaptor on a host computer, such as an Ethernet controller, Fibre Channel controller, etc., will receive Input/Output (I/O) requests or responses to I/O requests initiated from the host. Often, the host computer operating system includes a device driver to communicate with the network adaptor hardware to manage I/O requests to transmit over a network. The host computer further includes a transport protocol driver which packages data to be transmitted over the network into packets, each of which contains a destination address as well as a portion of the data to be transmitted. Data packets received at the network adaptor are often stored in an available allocated packet buffer in the host memory. The transport protocol driver processes the packets received by the network adaptor that are stored in the packet buffer, and accesses any I/O commands or data embedded in the packet.

For instance, the transport protocol driver may implement the Transmission Control Protocol (TCP) and Internet Protocol (IP) to encode and address data for transmission, and to decode and access the payload data in the TCP/IP packets received at the network adaptor. IP specifies the format of packets, also called datagrams, and the addressing scheme. TCP is a higher level protocol which establishes a connection between a destination and a source. A still higher level protocol, Remote Direct Memory Access (RDMA) establishes a higher level connection and permits, among other operations, direct placement of data at a specified memory location at the destination.

A device driver can utilize significant host processor resources to handle network transmission requests to the network adaptor. One technique to reduce the load on the host processor is the use of a TCP/IP Offload Engine (TOE) in which TCP/IP protocol related operations are implemented in the network adaptor hardware as opposed to the device driver, thereby saving the host processor from having to perform some or all of the TCP/IP protocol related operations. The transport protocol operations include packaging data in a TCP/IP packet with a checksum and other information, and unpacking a TCP/IP packet received from over the network to access the payload or data.

FIG. 1 illustrates a stream 10 of TCP/IP packets which are being sent from a source host to a destination host in a TCP connection. In the TCP protocol as specified in the industry accepted TCP RFC (request for comment), each packet is assigned a unique sequence number. As each packet is successfully sent to the destination host, an acknowledgment is sent by the destination host to the source host, notifying the source host by packet sequence number of the successful receipt of that packet. Accordingly, the stream 10 includes a portion 12 of packets which have been both sent and acknowledged as received by the destination host. The stream 10 further includes a portion 14 of packets which have been sent by the source host but have not yet been acknowledged as received by the destination host. The source host maintains a TCP Unacknowledged Data Pointer 16 which points to the sequence number of the first unacknowledged sent packet. The TCP Unacknowledged Data Pointer 16 is stored in a field 17a, 17b . . . 17n (FIG. 2) of a Protocol Control Block 18a, 18b . . . 18n, each of which is used to initiate and maintain one of a plurality of associated TCP connections between the source host and one or more destination hosts.

The capacity of the packet buffer used to store data packets received at the destination host is generally limited in size. In accordance with the TCP protocol, the destination host advertises how much buffer space it has available by sending a value referred to herein as a TCP Window indicated at 20 in FIG. 1. Accordingly, the source host uses the TCP Window value to limit the number of outstanding packets sent to the destination host, that is, the number of sent packets for which the source host has not yet received an acknowledgment. The TCP Window value for each TCP connection is stored in a field 21a, 21b . . . 21n of the Protocol Control Block 18a, 18b . . . 18n which controls the associated TCP connection.

For example, if the destination host sends a TCP Window value of 128 KB (kilobytes) for a particular TCP connection, the source host will according to the TCP protocol, limit the amount of data it sends over that TCP connection to 128 KB until it receives an acknowledgment from the destination host that it has received some or all of the data. If the destination host acknowledges that it has received the entire 128 KB, the source host can send another 128 KB. On the other hand, if the destination host acknowledges receiving only 96 KB, for example, the host source will send only an additional 96 KB over that TCP connection until it receives further acknowledgments.

A TCP Next Data Pointer 22 stored in a field 23a, 23b . . . 23n of the associated Protocol Control Block 18a, 18b . . . 18n, points to the sequence number of the next packet to be sent to the destination host. A portion 24 of the datastream 10 between the TCP Next Data Pointer 22 and the end 28 of the TCP Window 20 represents packets which have not yet been sent but are permitted to be sent under the TCP protocol without waiting for any additional acknowledgments because these packets are still within the TCP Window 20 as shown in FIG. 1. A portion 26 of the datastream 10 which is outside the end boundary 28 of the TCP Window 20, is not permitted to be sent under the TCP protocol until additional acknowledgments are received.

As the destination host sends acknowledgments to the source host, the TCP Unacknowledged Data Pointer 16 moves to indicate the acknowledgment of additional packets for that connection. The beginning boundary 30 of the TCP Window 20 shifts with the TCP Unacknowledged Data Pointer 16 so that the TCP Window end boundary 28 also shifts so that additional packets may be sent for the connection.

FIG. 3 illustrates a plurality of RDMA connections 50a, 50b . . . 50n, between various software applications of a source host and various storage locations of one or more destination hosts through a network. Each RDMA connection 50a, 50b . . . 50n runs over a TCP connection. In the RDMA protocol, as defined in the industry accepted RDMA RFC (request for comment), each RDMA connection 50a, 50b . . . 50n includes a queue pair 51a, 51b . . . 51n comprising a queue 52a, 52b . . . 52n which is created by a software application which intends to send messages to be stored at a specified memory location of a destination host. Each application queue 52a, 52b . . . 52n stores the messages to be sent by the associated software application. The size of each queue 52a, 52b . . . 52n may be quite large or relatively small, depending upon the number of messages to be sent by the associated application.

Each queue pair 51a, 5b . . . 51n of each RDMA connection 50a, 50b . . . 50n further includes a network interface queue 60a, 60b ... 60n which is paired with the associated application queue 52a, 52b ... 52n of the software applications. The network interface 62 includes various hardware, typically a network interface card, and various software including drivers which are executed by the host. The network interface may also include various offload engines to perform protocol operations.

In response to a request from an application to send messages to be stored at a specified destination host memory address at the other end of one of the RDMA connections 50a, 50b ... 50n, a network interface 62 obtains a message credit designated an "empty message" from a common pool 64 of empty messages. The size of the pool 64, that is, the number of messages which the network interface 62 can handle, is typically a function of the hardware capabilities of the network interface 62. If an empty message is available from the pool 64, a message is taken from the application queue 52a, 52b ... 52n of the requesting application and queued in the corresponding network interface queue 60a, 60b ... 60n of the queue pair 51a, 51b ... 51n of the particular RDMA connection 50a, 50b ... 50n. The messages queued in the network interface queues 60a, 60b ... 60n are sent over the network to the specified memory addresses of the destination hosts which acknowledge each message which is successfully received and stored at the specified memory address. Messages sent but not yet acknowledged are referred to herein as "uncompleted sent messages." Once a message is acknowledged as successfully received and stored by the destination host, an empty message is restored or replenished in the pool 64 of empty messages.

In accordance with the RDMA protocol, the total number of messages queued in all the network interface queues 60a, 60b ... 60n plus the total number of uncompleted messages sent by all the RDMA connections 50a, 50b ... 50n typically is not permitted to exceed the size of the pool 64 of empty messages. Once one of the RDMA connections 50a, 50b ... 50n reaches the limit imposed by the pool 64 of empty messages, no more RDMA messages from any of the connections 50a, 50b ... 50n may be queued and sent until additional acknowledgments are received.

Notwithstanding, there is a continued need in the art to improve the performance of connections.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 4:
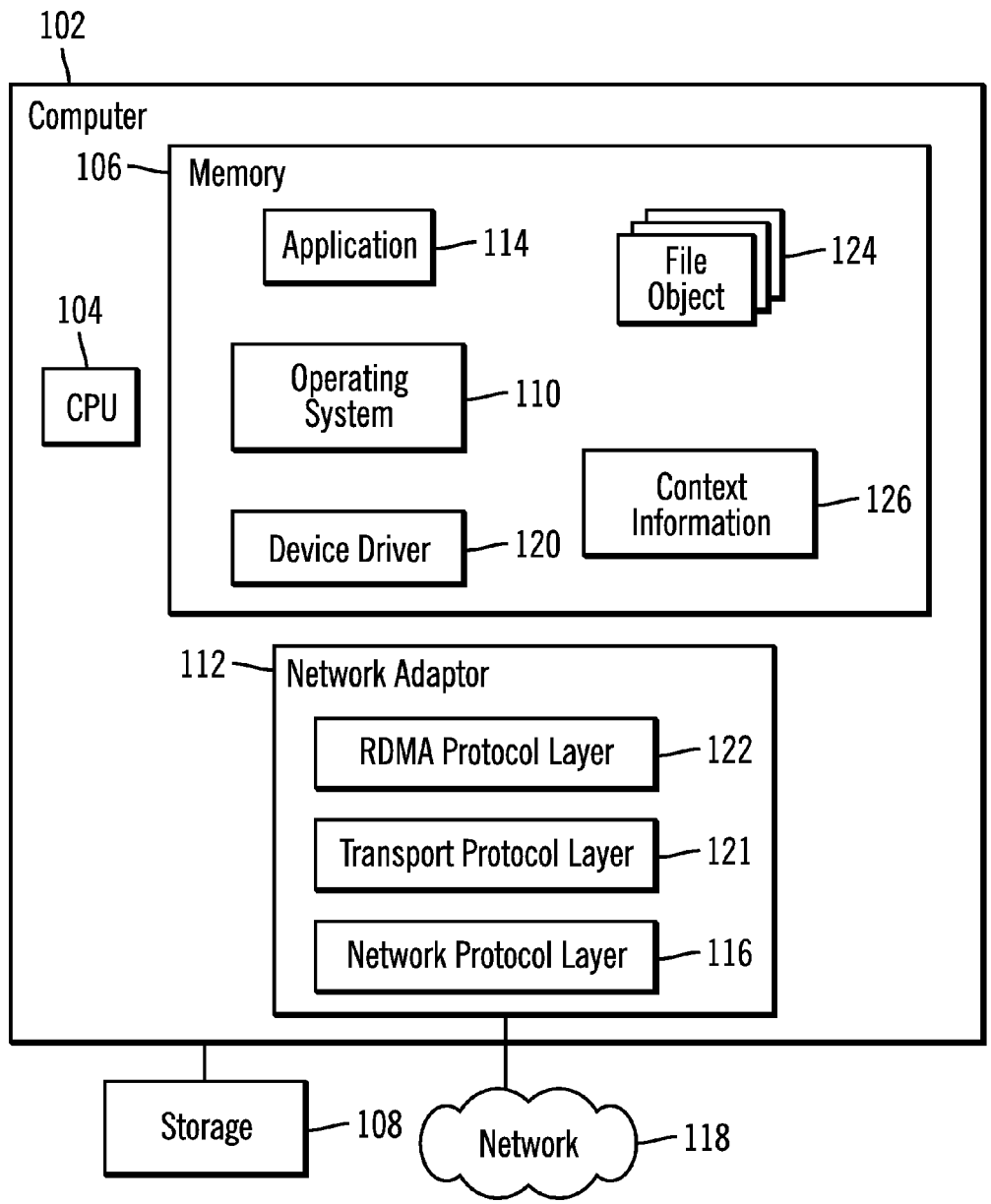
FIG. 4 illustrates one embodiment of a computing environment in which aspects of the invention are implemented.

FIG. 4 illustrates a computing environment in which aspects of the invention may be implemented. A computer 102 includes one or more a central processing units (CPU) 104 (only one is shown), a volatile memory 106, non-volatile storage 108, an operating system 110, and a network adaptor 112. An application program 114 further executes in memory 106 and is capable of transmitting and receiving packets from a remote computer. The computer 102 may comprise any computing device known in the art such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations.

The network adaptor 112 includes a network protocol layer 116 for implementing the physical communication layer to send and receive network packets to and from remote devices over a network 118. The network 118 may comprise a Local Area Network (LAN), the Internet, a Wide Area Network (WAN), Storage Area Network (SAN), etc. The embodiments may be configured to transmit data over a wireless network or connection, such as wireless LAN, Bluetooth, etc. In certain embodiments, the network adaptor 112 and network protocol layer 116 may implement the Ethernet protocol, token ring protocol, Fibre Channel protocol, Infiniband, Serial Advanced Technology Attachment (SATA), parallel SCSI, serial attached SCSI cable, etc., or any other network communication protocol known in the art.

A device driver 120 executes in memory 106 and includes network adaptor 112 specific commands to communicate with the network adaptor 112 and interface between the operating system 110 and the network adaptor 112. In certain implementations, the network adaptor 112 includes a transport protocol layer 121 as well as the network protocol layer 116. For example, the network adaptor 112 can implement a TCP/IP offload engine (TOE), in which transport layer operations are performed within the offload engines of the transport protocol layer 121 implemented within the network adaptor 112 hardware, as opposed to the device driver 120.

The network layer 116 handles network communication and provides received TCP/IP packets to the transport protocol layer 121 to decrypt the packets if encrypted. The transport protocol layer 121 interfaces with the device driver 120 and performs additional transport protocol layer operations, such as processing the decrypted content of messages included in the packets received at the network adaptor 112 that are wrapped in a transport layer, such as TCP and/or IP, the Internet Small Computer System Interface (iSCSI), Fibre Channel SCSI, parallel SCSI transport, or any other transport layer protocol known in the art. The transport offload engine 121 can unpack the payload from the received TCP/IP packet and transfer the data to the device driver 120 to return to the application 114.

In certain implementations, the network adaptor 112 can further include an RDMA protocol layer 122 as well as the transport protocol layer 121. For example, the network adaptor 112 can implement an RDMA offload engine, in which RDMA layer operations are performed within the offload engines of the RDMA protocol layer 122 implemented within the network adaptor 112 hardware, as opposed to the device driver 120.

Thus, an application 114 transmitting messages over an RDMA connection can transmit the message through the device driver 120 and the RDMA protocol layer 122 of the network adaptor 112. The data of the message can be sent to the transport protocol layer 121 to be packaged in a TCP/IP packet. The transport protocol layer 121 can further encrypt the packet before transmitting it over the network 118 through the network protocol layer 116.

The memory 106 further includes file objects 124, which also may be referred to as socket objects, which include information on a connection to a remote computer over the network 118. The application 114 uses the information in the file object 124 to identify the connection. The application 114 would use the file object 124 to communicate with a remote system. The file object 124 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 126 comprises a data structure including information the device driver 120 maintains to manage requests sent to the network adaptor 112 as described below.

Figure 5:
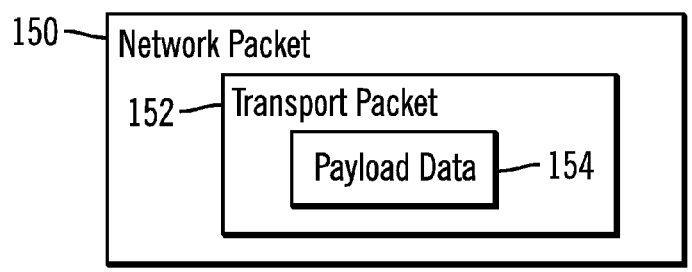
FIG. 5 illustrates a prior art packet architecture.

FIG. 5 illustrates a format of a network packet 150 received at or transmitted by the network adaptor 112. An RDMA message may include one or many such packets 150. The network packet 150 is implemented in a format understood by the network protocol 114, such as encapsulated in an Ethernet flame that would include additional Ethernet components, such as a header and error checking code (not shown). A transport packet 152 is included in the network packet 150. The transport packet may 152 comprise a transport layer capable of being processed by the transport protocol driver 121, such as the TCP and/or IP protocol, Internet Small Computer System Interface (iSCSI) protocol, Fibre Channel SCSI, parallel SCSI transport, etc. The transport packet 152 includes payload data 154 as well as other transport layer fields, such as a header and an error checking code. The payload data 154 includes the underlying content being transmitted, e.g., commands, status and/or data. The operating system 110 may include a device layer, such as a SCSI driver (not shown), to process the content of the payload data 154 and access any status, commands and/or data therein.

Figure 1:
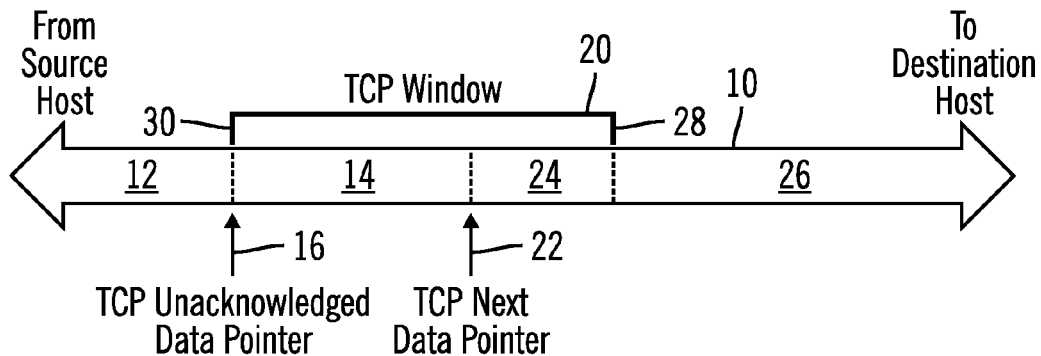
FIG. 1 illustrates a stream of data being transmitted in accordance with the prior art TCP protocol.
Figure 6:
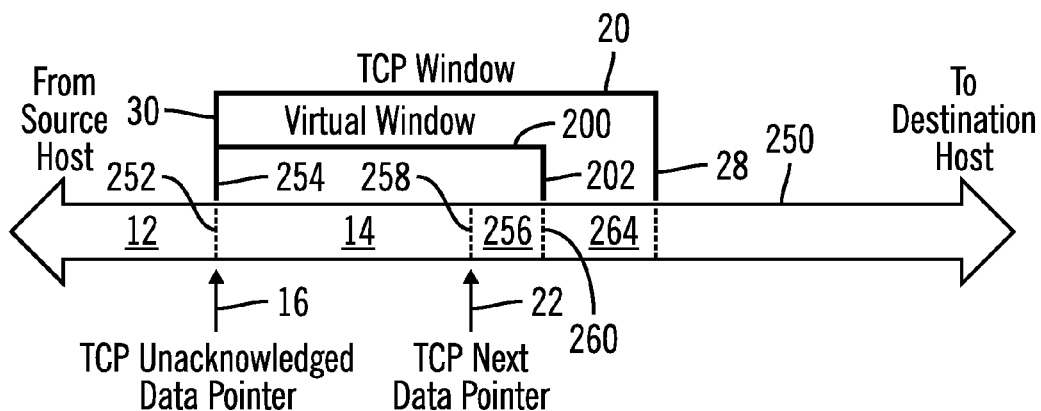
FIG. 6 illustrates one embodiment of a stream of data being transmitted in accordance with aspects of invention.

If a particular TCP connection of the source host is accorded a relatively large TCP window 20 (FIG. 1) when sending data over the TCP connection to a destination host, it is appreciated that the TCP connection having the large TCP window can continue sending data in a manner which uses up the resources of the source host to the exclusion of other TCP connections of the source host. As a consequence, the other TCP connections of the source host may be hindered from sending data. In one implementation as shown in FIG. 6, the computer 102 when sending data over a TCP connection imposes a Virtual Window 200 which can be substantially smaller than the TCP Window provided by the destination host of the TCP connection. When the TCP Next Data Pointer 22 reaches the end boundary 202 of the Virtual Window 200, the host source 102 stops sending data over that TCP connection even though the TCP Next Data Pointer 22 has not yet reached the end boundary 28 of the TCP Window 20. As a consequence, other connections are provided the opportunity to utilize the resources of the computer 102 such that the resources may be shared more fairly.

Figure 2:
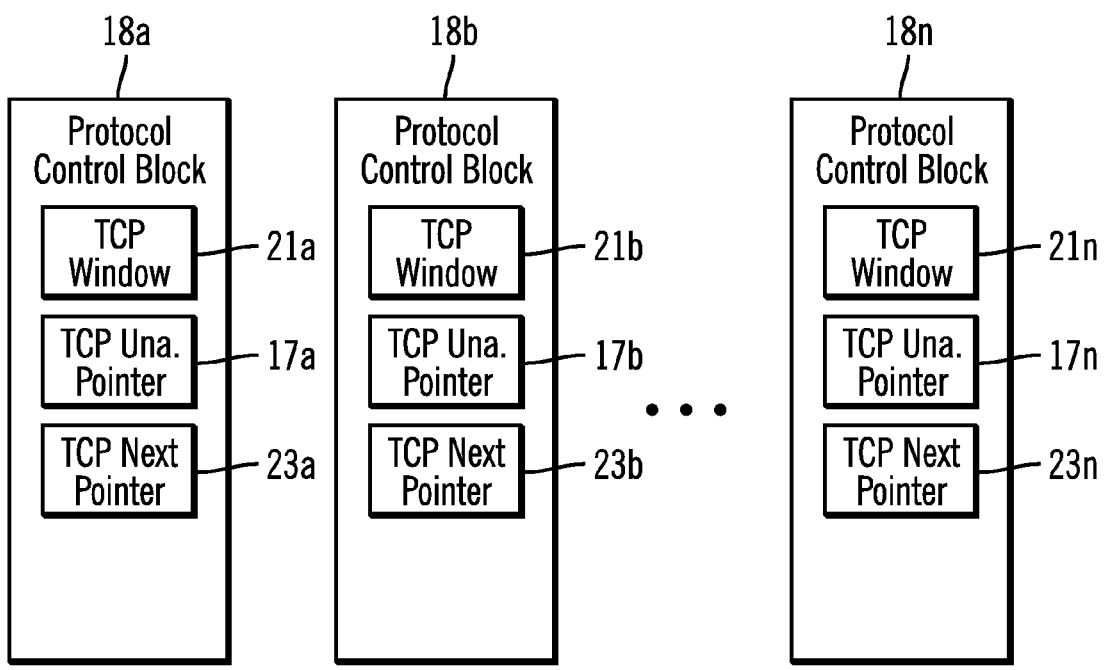
FIG. 2 illustrates prior art Protocol Control Blocks in accordance with the TCP protocol.
Figure 7:
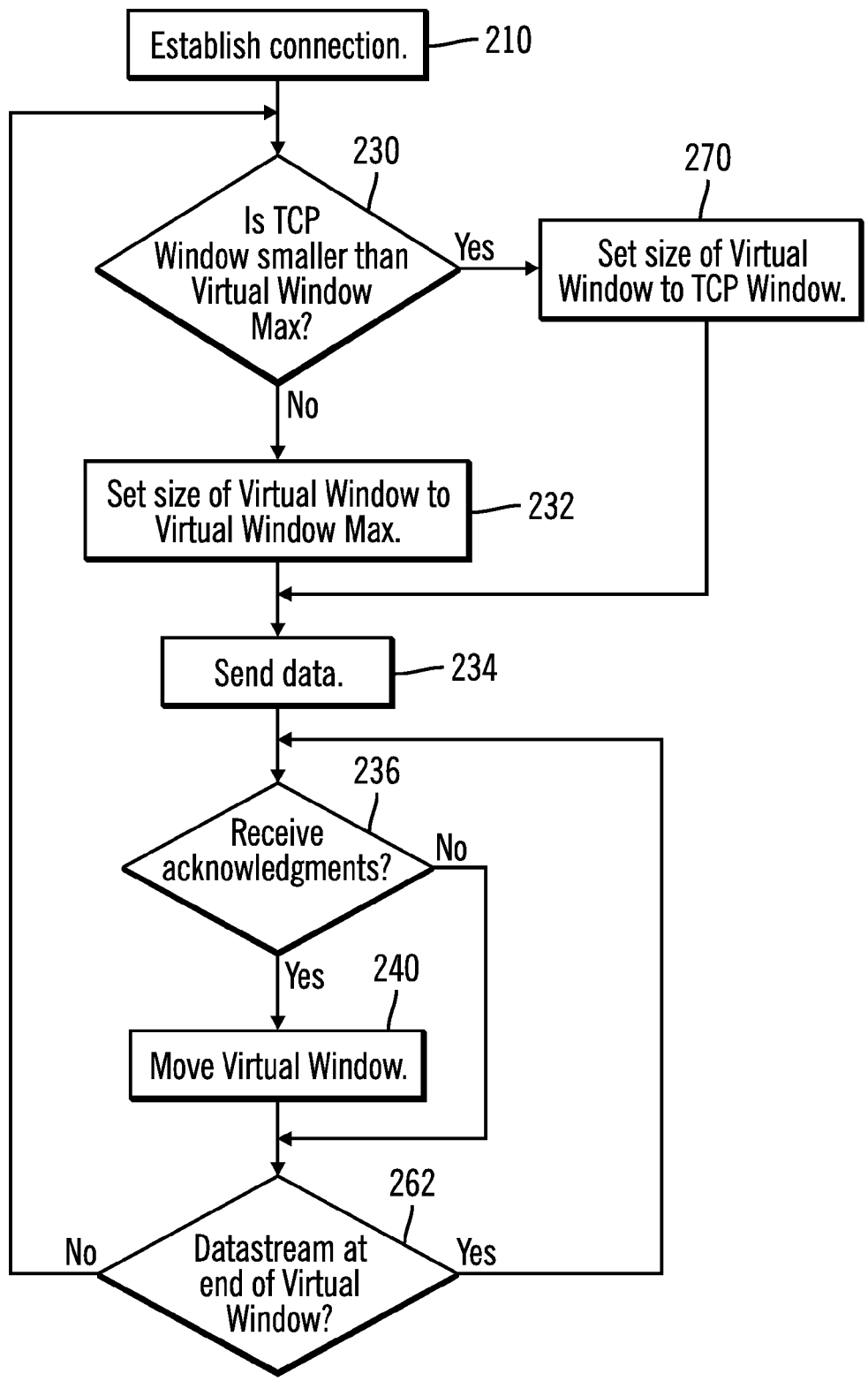
FIG. 7 illustrates one embodiment of operations performed to manage a transmission of data in accordance with aspects of the invention.

FIG. 7 illustrates operations of the device driver 120 and the network adapter 122 in using a Virtual Window 200 to distribute the data transmission resources of the computer 102. In response to a request by a software application 114, a TCP connection is established (block 210) between the computer 102 and a destination host. In establishing the TCP connection, a Protocol Control Block such as one of the Protocol Control Blocks 222a, 222b . . . 222n (FIG. 8) is populated in a manner similar to the Protocol Control Blocks 18a, 18b . . . 18n of FIG. 2. Each Protocol Control Block 222a, 222b . . . 222n has a field 17a, 17b . . . 17n for storing the TCP Unacknowledged Data Pointer 16, a field 21a, 21b . . . 21n for storing the TCP Window, and a field 23a, 23b . . . 23n for storing a TCP Next Pointer of the associated TCP connection in accordance with the TCP RFC.

In this implementation, the Virtual Window 200 for this TCP connection has a maximum value referred herein as a Virtual Window Maximum which is stored in a field 224a, 224b . . . 224n of the associated Protocol Control Block 222a, 222b . . . 222n. The size of the TCP Window 20 received from the destination host of the TCP connection is compared (block 230) to the size of the Virtual Window Maximum. If the TCP Window 20 is not smaller than the Virtual Window Maximum, the size of the Virtual Window 200 is set (block 232) to the size of the Virtual Window Maximum stored in the field 224a, 224b . . . 224n of the Protocol Control Block 222a, 222b . . . 222n which controls the TCP connection. The size of the Virtual Window 200 is stored in the field 233a, 233b . . . 233n of the Protocol Control Block 222a, 222b . . . 222n which controls the TCP connection.

Prior to sending any data, the TCP Unacknowledged Data Pointer 16 of the Protocol Control Block 222a, 222b . . . 222n which controls the TCP connection is set to the sequence number of the first data packet to be sent. The computer 102 initiates (block 234) the sending of packets of data to the destination host. The amount of data sent in this step may vary depending upon the particular application. However, in many applications the amount of data sent in this step will be a relatively small proportion of the size of the Virtual Window 200. The TCP Next Data Pointer 22 of the Protocol Control Block 222a, 222b . . . 222n which controls the TCP connection is set to the sequence number of the next data packet to be sent.

Following the sending of these data packets, a check (block 236) is made to determine if the destination host has acknowledged receiving any of the sent data packets. If so, the Virtual Window 200 (FIG. 6) is moved (block 240) by moving forward the TCP Unacknowledged Data Pointer 16 of the Protocol Control Block 222a, 222b . . . 222n which controls the TCP connection. The TCP Unacknowledged Data Pointer 16 is moved forward in the sequence to mark the beginning of the sequence numbers of the data packets which have been sent but not yet acknowledged. Those data packets which have been sent but not yet acknowledged are indicated in FIG. 6 as a portion 14 of the data stream 250 of data packets being sent. Those data packets which have both been sent and acknowledged are indicated in FIG. 6 as portion 12. The TCP Unacknowledged Data Pointer 16 marks the boundary 252 between the sent and acknowledged packets 12 and the sent but not acknowledged packets 14 of the stream 250. The TCP Unacknowledged Data Pointer 16 also marks the start boundary 254 of the Virtual Window 200 and the TCP Window 20.

Hence as the TCP Unacknowledged Data Pointer 16 is moved (block 240), the Virtual Window 200 and the TCP Window 20 are moved as well when the destination host acknowledges (block 236) the receipt of data packets through this particular TCP connection with the computer 110. Alternatively, if no packets have been acknowledged (block 236), the Virtual Window 200, the TCP Window 20 and the TCP Unacknowledged Data Pointer 16 remain unmoved.

Those data packets which have not yet been sent but are permitted to be sent without receipt of any further acknowledgments are indicated in FIG. 6 as a portion 256. The TCP Next Data Pointer 22 marks the start boundary 258 of the portion 256 and the end boundary 202 of the Virtual Window 200 marks the end boundary 260 of the permitted but not yet sent datastream portion 256. If the TCP Next Data Pointer 22 has reached the end boundary 202 of the Virtual Window 200, indicating that the stream of sent data has reached (block 262) the end of the Virtual Window 200, the portion 256 is of zero size and no further data packets can be sent until additional acknowledgments are received (block 236) from the destination host. Once additional acknowledgments are received, the Virtual Window 200 (block 240) will be moved thereby forming a new portion 256 and permitting the sending of additional packets.

It is noted that the stream of sent but unacknowledged data packets (portion 14) is paused when it reaches the end boundary 202 of the Virtual Window 200 rather than the end boundary 28 of the larger TCP Window 20. Thus a portion 264 of the datastream 250 between the end boundary 202 of the Virtual Window 200 and the end boundary 28 of the TCP Window 20 which would have been permitted to be sent without waiting for additional acknowledgments is withheld from being sent until additional acknowledgments are received. As a consequence, other connections may utilize the resources of the computer 110 to send data packets while the connection which has reached the end boundary 202 of its Virtual Window 200 awaits additional acknowledgments.

If the TCP Next Data Pointer 22 has not reached the end boundary 202 of the Virtual Window 200, indicating that the stream of sent data has not reached (block 262) the end of the Virtual Window 200, the portion 256 is of nonzero size. Consequently, additional data packets can be sent (block 234) until the end of the Virtual Window is reached (block 262).

Figure 9:
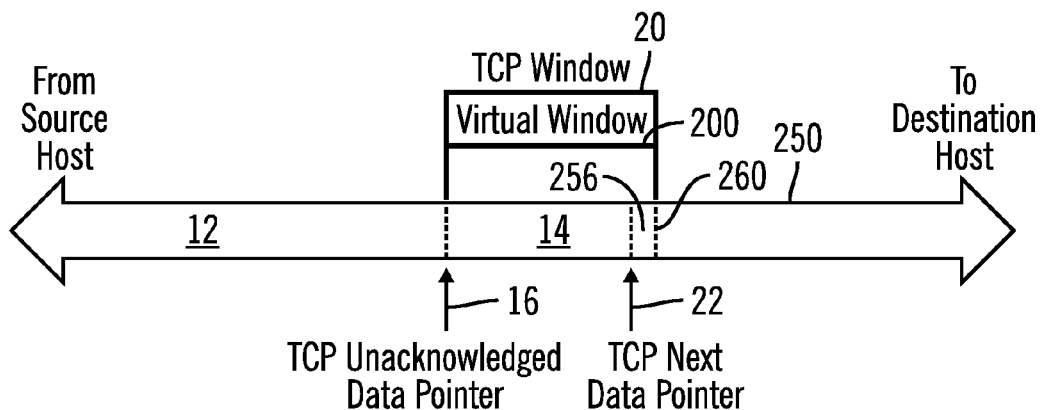
FIG. 9 illustrates one mode of the operations of FIG. 7.

It is recognized that the destination host may begin to run out of buffer space and as a result, advertise a smaller TCP Window 20. In which case, the value of the TCP Window stored in the field 21a, 21b . . . 21n of the associated Protocol Control Block 222a, 222b . . . 222n may be reset to this smaller value. If the TCP Window 20 of the destination host should become smaller (block 230) than the Virtual Window Maximum, the size of the Virtual Window 200 can be reset (block 270) to the size of the TCP Window as shown in FIG. 9. Thus, the end boundary 202 of the virtual window 200 coincides with the end boundary 28 of the TCP Window 20. As a consequence, the Virtual Window 200 will not exceed the capabilities of the destination host as indicated by the TCP Window 200 advertised by the destination host.

In the implementation of FIG. 7, the Virtual Window 200 is set to be the smaller of the TCP Window 20 and the Virtual Window Maximum. It is appreciated that the Virtual Window may be set using a variety of approaches. For example, the Virtual Window Maximum may be a fixed size such as 16 KB for example. Alternatively, the size of the Virtual Window may vary as a function of the size of the TCP Window advertised by the destination host. For example, the Virtual Window may be set as a fraction of the TCP Window. This fraction may be a fixed fraction, for example. Furthermore, the Virtual Window may be set as a function of the number of active connections of the driver or network adapter. Thus, for example, the Virtual Window may be set as a fraction 1/N of the TCP Window, where N is the number of active connections of the driver or network adapter.

Still further, each Virtual Window Maximum 224a, 224b . . . 224n may be programmed to allow a high quality of service (QoS) for one connection over another by providing a larger Virtual Window Maximum for those connections for which a higher QoS is desired. Also, the Virtual Window Maximum may be changed at any time during a particular connection. Thus, the ability to arbitrarily change the Virtual Window Maximum associated with a particular connection can be used to change the QoS at any time in the life of the connection.

Figure 3:
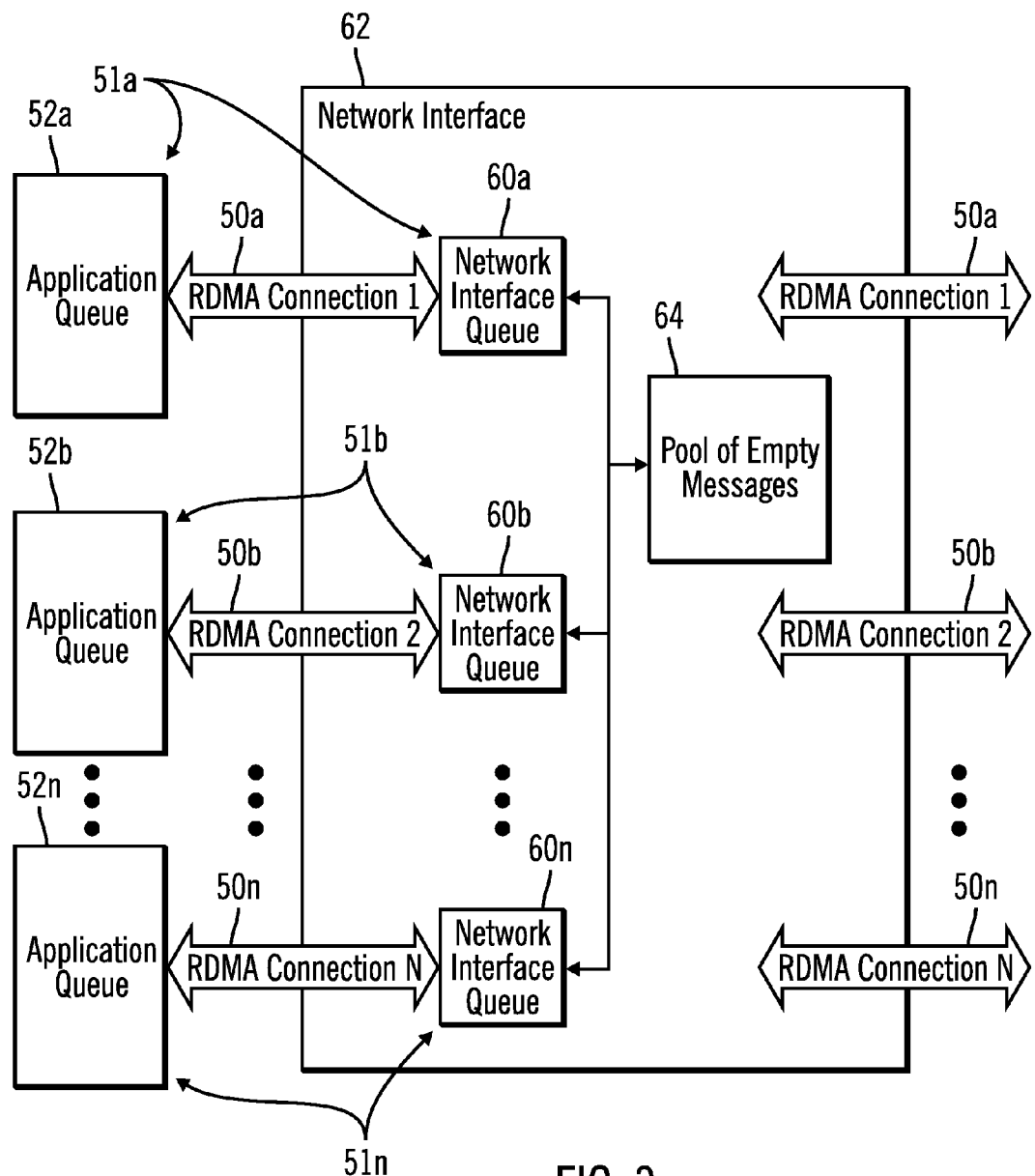
FIG. 3 illustrates a prior art network interface and message queues of RDMA connections.

It is further appreciated that for some applications, one of the applications 114 (FIG. 4) of the computer 102 may generate an application queue 52a, 52b . . . 52n (FIG. 3) for an RDMA connection 50a, 50b . . . 50n which is substantially larger than the entire pool 64 of empty messages. This may occur for example if the application has a large number of messages to store in a specified memory location of a destination host over an RDMA connection. The RDMA connection having the large application queue can dominate usage of the empty messages of the pool 64 and thereby continue to send messages in a manner which uses up the resources of the source host to the exclusion of other RDMA connections of the source host. As a consequence, the other RDMA connections of the source host may be hindered from sending messages.

Figure 10:
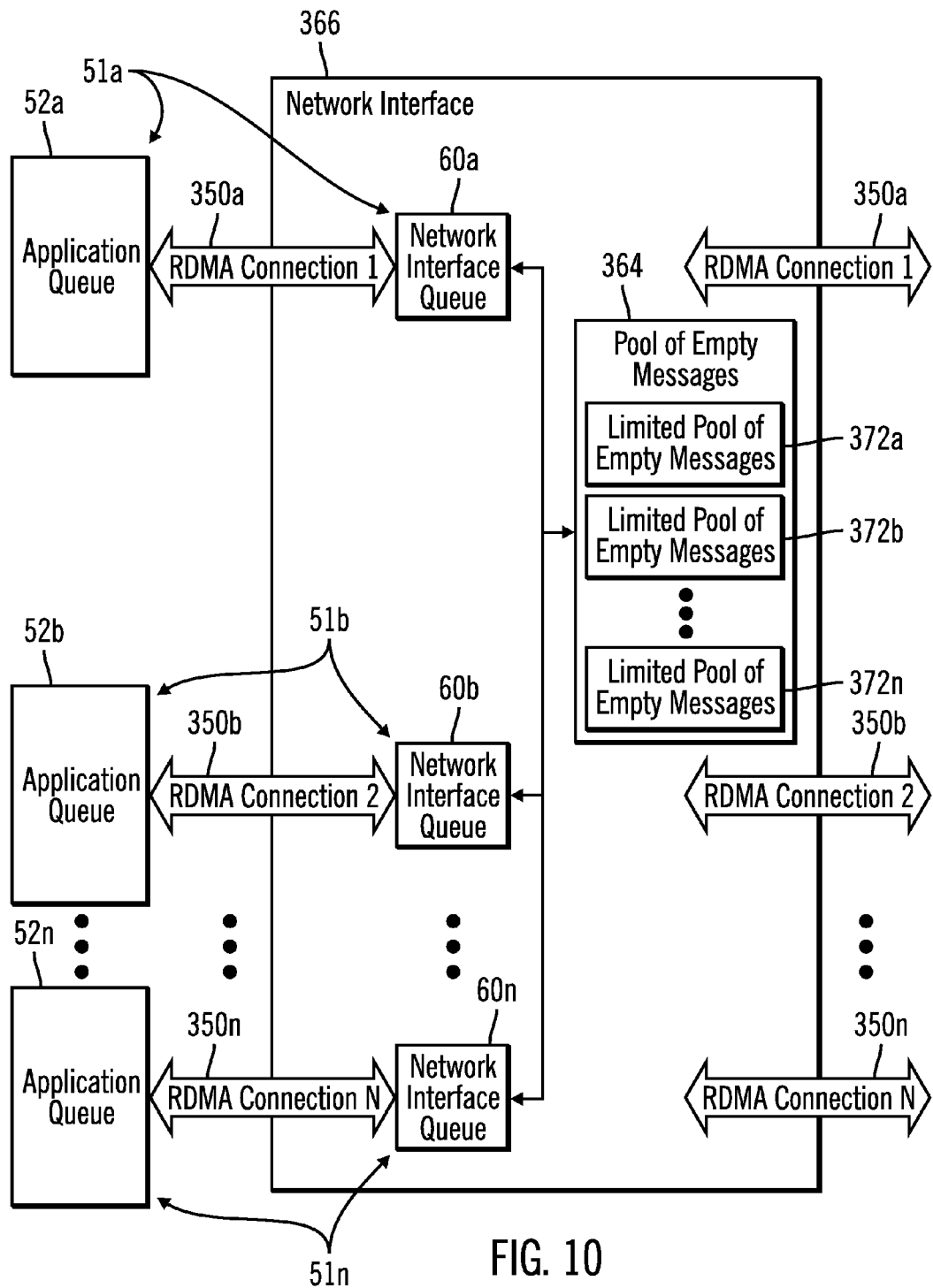
FIG. 10 illustrates one embodiment of a network interface and message queues for RDMA connections in accordance with aspects of the invention.

In one implementation as shown in FIG. 10, the computer 102 when sending messages over an RDMA connection 350a, 350b . . . 350n imposes a limit on the number of empty messages of a pool 364 of a network interface 366, which any one of the RDMA connections 350a, 350b . . . 350n can consume. More specifically, the pool 364 of empty messages is subdivided into a plurality of Limited Pools of Empty Messages 372a, 372b . . . 372n, each of which can be substantially smaller than the entire Pool of Empty Messages 364. When one of the RDMA connections 350a, 350b . . . 350n has reached the limit imposed by its associated Limited Pool of Empty Messages 372a, 372b . . . 372n, the host source 102 stops pulling messages from the associated application queue 52a, 52b . . . 52n of that particular RDMA connection even though other empty messages remain unused in the pool 364 of empty messages. The host source 102 resumes pulling messages from the associated application queue 52a, 52b . . . 52n of that particular RDMA connection when additional empty messages are replenished in the associated Limited Pool of Empty Messages 372a, 372b . . . 372n. As a consequence, other RDMA connections are provided the opportunity to utilize the resources of the computer 102 such that the resources may be shared more fairly.

Figure 11:
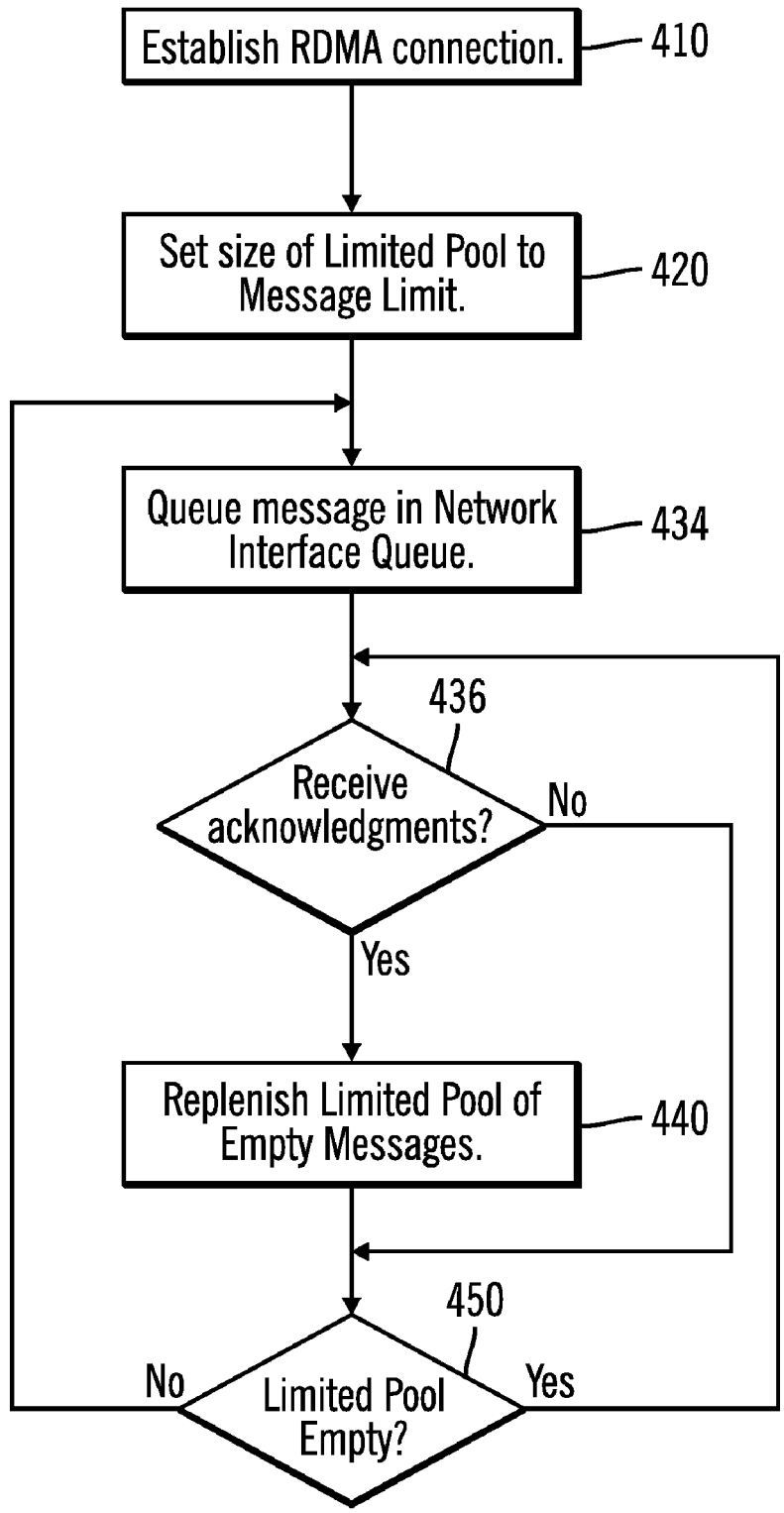
FIG. 11 illustrates another embodiment of operations performed to manage a transmission of data in accordance with aspects of the invention.

FIG. 11 illustrates operations of the device driver 120 and the network adapter 122 in using a Limited Pool of Empty Messages 372a, 372b . . . 372n to distribute the message transmission resources of the computer 102. In this example, the RDMA connection 350a is discussed. The other RDMA connections 350b . . . 350n operate in a similar fashion.

In response to a request by a software application 114, the RDMA connection 350a is established (block 410) between the computer 102 and a destination host. In one implementation, the RDMA connection 350a runs over a TCP connection. Thus, in establishing the RDMA connection 350a, a Protocol Control Block 222a of the Protocol Control Blocks 222a, 222b ... 222n (FIG. 8) is populated to include a field 17a for storing the TCP Unacknowledged Data Pointer 16, a field 21a for storing the TCP Window, and a field 23a for storing a TCP Next Pointer of the associated TCP connection in accordance with the TCP RFC. In addition, the TCP connection may utilize a Virtual Window 200 to provide fairness among the TCP connections of the computer 102 as discussed above. Hence, a Virtual Window Maximum may be stored in a field 224a of the associated Protocol Control Block 222a.

The size of the Limited Pool of Empty Messages 372a of the particular RDMA connection 350a is set (block 420) to the size of the Message Limit value stored in a field 424a of the associated Protocol Control Block 222a. In the illustrated embodiment, the RDMA connection parameters are stored in the same Protocol Control Block as a TCP connection parameters. It is appreciated that the RDMA connection parameters may be stored in a wholly separate Control Block or other data structure.

The computer 102 initiates the sending of messages to the specified address of the destination host by taking a message from the application queue 52a of the queue pair 51a of the particular RDMA connection 350a and queues (block 434) the message in the network interface queue 60a which is paired with the associated application queue 52a of the software application. The queuing of messages in the network interface queue 60a consumes one empty message from the associated Limited Pool of Empty Messages 372a of the RDMA connection 350a for each message so queued. The number of messages queued in this step may vary depending upon the particular application. However, in many applications the amount of data queued will be a relatively small proportion of the size of the Message Limit.

Following the queuing of this message or messages, a check (block 436) is made to determine if the destination host has acknowledged receiving any of the messages sent in the RDMA connection 350a. If so, an empty message is replenished (block 440) in the associated Limited Pool of Empty Messages 372a of the RDMA connection 350a for each message so acknowledged.

A check is made (block 450) to determine whether the associated Limited Pool of Empty Messages 372a of the RDMA connection 350a is empty. If so, no more RDMA messages from the particular RDMA connection 350a may be queued in the network interface queue 60a for sending to the destination host until additional acknowledgments are received. Hence, control is returned to block 436 to await further acknowledgments for RDMA connection 350a. If on the other hand, the Limited Pool of Empty Messages 372a of the RDMA connection 350a is not empty (block 450), additional RDMA messages from the application queue 52a of the RDMA connection 350a may be queued in the network interface queue 60a for sending to the destination host. In this manner, the total number of messages queued in the network interface queue 60a plus the total number of uncompleted messages sent by the RDMA connection 350a may not exceed the size of the Message Limit used to set the size of the Limited Pool of Empty Messages 372a of the RDMA connection 350a.

The RDMA connections 350b ... 350n operate in a similar manner. Hence, a Message Limit is stored in a field 424b ... 424n of the Protocol Control Block 222b ... 222n associated with each RDMA connection 350b ... 350n.

In the implementation of FIG. 11, the size of each Limited Pool of Empty Messages 372a, 372b ... 372n of the RDMA connections 350a, 350b ... 350n is set to be the Message Limit stored in the Protocol Control Block 222a, 222b ... 222n associated with each RDMA connection 350a, 350b ... 350n. It is appreciated that the size of each Limited Pool of Empty Messages 372a, 372b ... 372n may be set using a variety of approaches. For example, the Message Limit may be a fixed size, such as a fixed number of messages, for example. Also, the size of the Message Limit for each RDMA connection may be set as a fixed fraction of the size of the Pool 364 of empty messages. Alternatively, the size of the Message Limit for each RDMA connection may vary as a function of the size of the associated application queue 52a, 52n ... 52n. For example, the size of the Message Limit for each RDMA connection may be set as a fraction of the size of the Pool 364 of empty messages wherein the size of each fraction is proportionate to the size of the associated application queue 52a, 52n ... 52n. Furthermore, the Message Limit for each RDMA connection may be set as a function of the number of active connections of the driver or network adapter. For example, the size of the Message Limit for each RDMA connection may be set as a fraction 1/N of the size of the Pool 364 of empty messages where N is the number of active connections of the driver or network adapter. In this example, the total of all of the Limited Pools of Empty Messages 372a, 372b ... 372n would remain equal to or less than the entire Pool 364 of empty messages. Also, each queue pair 51a, 51b ... 51n may have a separate pool of empty messages for each RDMA connection 350a, 350b ... 350n.

Still further, each of the Limited Pools of Empty Messages 372a, 372b ... 372n may be programmed to allow a higher quality of service (QoS) for one connection over another by providing a larger Limited Pool of Empty Messages for those connections for which a higher QoS is desired. Also, the Limited Pool of Empty Messages may be changed at any time during a particular connection. Thus, the ability to arbitrarily change the Limited Pool of Empty Messages associated with a particular connection can be used to change the QoS at any time in the life of the connection.

Thus, it is seen that both the Virtual Window Maximum 224a, 224b ... 224n and the Limited Pool of Empty Messages 372a, 372b ... 372n may be programmed for each connection to allow different levels of quality of service (QoS) which can behave preferentially, depending upon the needs of the application. Moreover, both the Virtual Window Maximum 224a, 224b ... 224n the Limited Pool of Empty Messages 372a, 372b ... 372n may be changed to change the QoS at any time in the life of the connection.

ADDITIONAL EMBODIMENT DETAILS

The described techniques for processing requests directed to a network card may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the device driver 120, or by protocol layers of the network adaptor 112. In alterative embodiments, operations described as performed by the device driver 120 may be performed by the network adaptor 112, and vice versa.

In the described embodiments, the packets are transmitted from a network adaptor card to a remote computer over a network. In alternative embodiments, the transmitted and received packets processed by the protocol layers or device driver may be transmitted to a separate process executing in the same computer in which the device driver and transport protocol driver execute. In such embodiments, the network card is not used as the packets are passed between processes within the same computer and/or operating system.

In certain implementations, the device driver and network adaptor embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the device driver and network adaptor embodiments may be implemented in a computer system including a video controller to render information to display on a monitor coupled to the computer system including the device driver and network adaptor, such as a computer system comprising a desktop, workstation, server, mainframe, laptop, handheld computer, etc. Alternatively, the network adaptor and device driver embodiments may be implemented in a computing device that does not include a video controller, such as a switch, router, etc.

In certain implementations, the network adaptor may be configured to transmit data across a cable connected to a port on the network adaptor. Alternatively, the network adaptor embodiments may be configured to transmit data over a wireless network or connection, such as wireless LAN, Bluetooth, etc.

Figure 8:
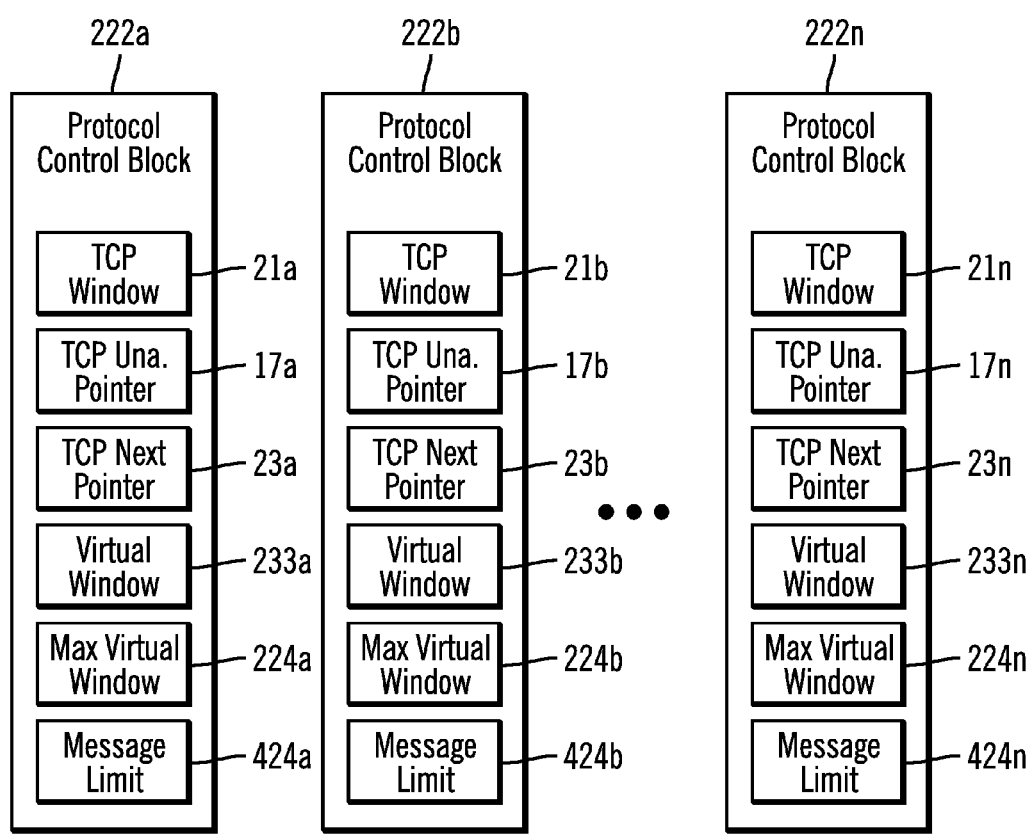
FIG. 8 illustrates one embodiment of a data structure to store information used to manage transmission of data in accordance with aspects of the invention.

FIG. 8 illustrates information used to populate Protocol Control Blocks. In alternative implementation, these data structures may include additional or different information than illustrated in the figures.

The illustrated logic of FIGS. 7 and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 12:
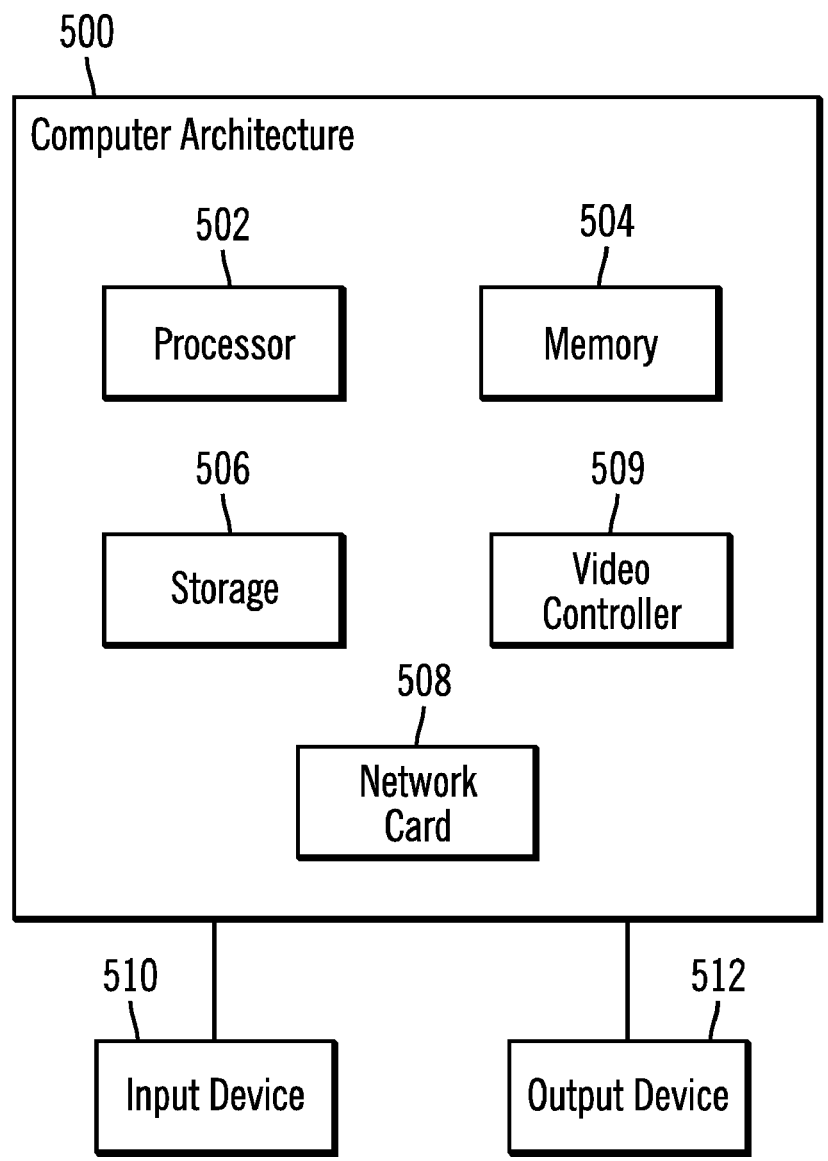
FIG. 12 illustrates an architecture that may be used with the described embodiments.

FIG. 12 illustrates one implementation of a computer architecture 500 of the network components, such as the hosts and storage devices shown in FIGS. 4 and 10. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network card 508 to enable communication with a network, such as an Ethernet, a Fibre Channel Arbitrated Loop, etc. Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple network cards. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The network adaptor 508 may be implemented on a network card, such as a Peripheral Component Interconnect (PCI) card or some other I/O card, or on integrated circuit components mounted on the motherboard or in software.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for sending data in a computer system, comprising:

establishing a plurality of active direct memory access connections between the host and a plurality of destinations;

establishing for each connection a Protocol Control Block, each Protocol Control Block having a first window field, a virtual window field and a message limit field, for the associated connection;

receiving from each destination a first window value representing a first quantity of data packets for the connection associated with the destination, and storing the received first window value in a first window field of the Protocol Control Block associated with the connection;

for each Protocol Control Block, storing the value of a second quantity of data packets in the virtual window field of the Protocol Control Block, wherein the second quantity of each connection is less than the first window field value of the connection and is based, at least in part, on the number of active connections of the host;

sending packets of data from said host to each destination;

receiving an acknowledgment from each destination for each packet of data received by each destination wherein the first window value of each connection represents a limit imposed on said host by the destination of the connection on the quantity of data packets sent from said host to the destination of the connection and lacking an acknowledgment of being received by the destination of the connection; and limiting the number of packets sent by said host to each connection, but not acknowledged as received by the destination of each connection, to the value of the virtual window field of the Protocol Control Block associated with the connection, wherein the value of the virtual window field of the Protocol Control Block associated with the connection is less than the value of the first window field of the Protocol Control Block associated with the connection;

sending a plurality of messages to specified memory locations of the destinations of the direct memory access connections wherein each message comprises a plurality of data packets;

receiving message acknowledgments, each message acknowledgment being sent by a destination for each message received by the destination; and for each connection, establishing a message limit and storing the value of the message limit in the message limit field of the Protocol Control Block associated with the connection; and for each connection, limiting the number of messages sent by said host through the connection, but not acknowledged as received by the destination of the connection, to the value of the message limit field of the Protocol Control Block associated with the connection so that each message limit imposes a separate limit for each direct memory access connection on the quantity of messages sent from said host to the specified memory location of the direct memory access connection associated with the message limit and lacking a message acknowledgment of being received by the destination of the direct memory access connection associated with the message limit, each message limit providing a further limit on the associated connection in addition to the packet limit imposed by the value of the virtual window field of the Protocol Control Block associated with the connection.

2. The method of claim 1, wherein each direct memory access connection includes a network interface between an application of said host and a network connecting the host to the plurality of destinations and wherein said network interface includes a queue for each direct memory access connection and adapted to queue messages to be sent through the direct memory access connection associated with each queue, and wherein said each sending of a message to specified memory location of the destination of a direct memory access connection includes queuing the message in the network interface queue associated with the direct memory access connection; and wherein the queuing of messages in the network interface queue associated with a direct memory access connection is suspended when the quantity of messages sent from said host to the specified memory location of the associated direct memory access connection and lacking a message acknowledgment of being received by the destination of the associated direct memory access connection reaches the separate message limit imposed on the direct memory access connection associated with the network interface queue.

3. The method of claim 2, wherein the queuing of messages in the network interface queue associated with a direct memory access connection is resumed when the quantity of messages sent from said host to the specified memory location of the associated direct memory access connection and lacking a message acknowledgment of being received by the destination of the associated direct memory access connection is less than the separate message limit imposed on the direct memory access connection associated with the network interface queue.

4. The method of claim 3 wherein each active direct memory access connection includes a Transmission Control Protocol connection between the host and the destination and wherein said first window value is a Transmission Control Protocol send window value and wherein each direct memory access connection is a Remote Direct Memory Access connection between the host and the destination of the direct memory access connection and each message is a Remote Direct Memory Access message.

5. The method of claim 4 wherein said network interface has a pool of empty messages which imposes a limit on the total quantity of messages sent from said host to all the specified memory locations of all the direct memory access connections and lacking a message acknowledgment of being received by the destination of the associated direct memory access connection and wherein each message limit is less than the network interface pool of empty messages.

6. The method of claim 1 wherein each active direct memory access connection includes a Transmission Control Protocol connection between the host and the destination and wherein said first window value is a Transmission Control Protocol send window value.

7. The method of claim 6 further comprising, in response to the destination reducing the size of the Transmission Control Protocol send window value to a third quantity less than the second quantity, limiting the number of packets sent by said host, but not acknowledged as received by said destination, to a fourth quantity of data packets no greater than the reduced size of the Transmission Control Protocol send window value; and storing the value of the fourth quantity of data packets in the virtual window field of the associated Protocol Control Block.

8. The method of claim 1 further comprising changing the size of a message limit of an active direct memory access connection prior to sending at least one message through the associated direct memory access connection.

9. The method of claim 8 wherein each message limit is based, at least in part, on the number of active direct memory access connections of the host.

10. The method of claim 1 wherein each message limit is based, at least in part, on the number of active direct memory access connections of the host.

11. The method of claim 1 further comprising changing the size of the second quantity of packets limiting the number of packets sent by the host but not acknowledged as received by the destination prior to sending at least one packet.

12. A system adapted to communicate with data storage and a destination having memory locations, comprising:

a system memory;

a processor coupled to the system memory;

a network adaptor;

a data storage controller for managing Input/Output (I/O) access to the data storage; and a device driver executable by the processor in the memory, wherein at least one of the device driver and the network adaptor is adapted to:
- establish a plurality of active direct memory access connections between the system and a plurality of destinations;
- establish for each connection a Protocol Control Block, each Protocol Control Block having a first window field, a virtual window field and a message limit field, for the associated connection;
- receive from each destination a first window value representing a first quantity of data packets for the connection associated with the destination, and store the received first window value in a first window field of the Protocol Control Block associated with the connection;
- for each Protocol Control Block, store the value of a second quantity of data packets in the virtual window field of the Protocol Control Block, wherein the second quantity of each connection is less than the first window field value of the connection and is based, at least in part, on the number of active connections of the system;
- send packets of data from said system to each destination;
- receive an acknowledgment from each destination for each packet of data received by each destination wherein the first window value of each connection represents a limit imposed on said system by the destination of the connection on the quantity of data packets sent from said system to the destination of the connection and lacking an acknowledgment of being received by the destination of the connection; and
- limit the number of packets sent by said system to each connection, but not acknowledged as received by the destination of each connection, to the value of the virtual window field of the Protocol Control Block associated with the connection, wherein the value of the virtual window field of the Protocol Control Block associated with the connection is less than the value of the first window field of the Protocol Control Block associated with the connection;
- send a plurality of messages to specified memory locations of the destinations of the direct memory access connections wherein each message comprises a plurality of data packets;
- receive message acknowledgments, each message acknowledgment being sent by a destination for each message received by the destination; and
- for each connection, establish a message limit and store the value of the message limit in the message limit field of the Protocol Control Block associated with the connection; and
- for each connection, limit the number of messages sent by said system through the connection, but not acknowledged as received by the destination of the connection, to the value of the message limit field of the Protocol Control Block associated with the connection so that each message limit imposes a separate limit for each direct memory access connection on the quantity of messages sent from said system to the specified memory location of the direct memory access connection associated with the message limit and lacking a message acknowledgment of being received by the destination of the direct memory access connection associated with the message limit, each message limit providing a further limit on the associated connection in addition to the packet limit imposed by the value of the virtual window field of the Protocol Control Block associated with the connection.

13. The system of claim 12, wherein at least one of the device driver and the network adaptor is adapted to provide a queue for each direct memory access connection and adapted to queue messages to be sent through the direct memory access connection associated with each queue, and wherein in each sending of a message to specified memory location of the destination of a direct memory access connection, at least one of the device driver and the network adaptor is adapted to queue the message in the queue associated with the direct memory access connection; and to suspend the queuing of messages in the queue associated with a direct memory access connection when the quantity of messages sent from said system to the specified memory location of the associated direct memory access connection and lacking a message acknowledgment of being received by the destination of the associated direct memory access connection reaches the separate message limit imposed on the direct memory access connection associated with the queue.

14. The system of claim 13, wherein at least one of the device driver and the network adaptor is adapted to resume the queuing of messages in the queue associated with a direct memory access connection when the quantity of messages sent from said system to the specified memory location of the associated direct memory access connection and lacking a message acknowledgment of being received by the destination of the associated direct memory access connection is less than the separate message limit imposed on the direct memory access connection associated with the network interface queue.

15. The system of claim 14 wherein each active direct memory access connection includes a Transmission Control Protocol connection between the host and the destination and wherein said first window value is a Transmission Control Protocol send window value and wherein each direct memory access connection is a Remote Direct Memory Access connection between the system and the destination of the direct memory access connection and each message is a Remote Direct Memory Access message.

16. The system of claim 15 wherein at least one of the device driver and the network adaptor is adapted to provide a pool of empty messages which imposes a limit on the total quantity of messages sent from said system to all the specified memory locations of all the direct memory access connections and lacking a message acknowledgment of being received by the destination of the associated direct memory access connection and wherein each message limit is less than the pool of empty messages.

17. The system of claim 12, wherein each active direct memory access connection includes a Transmission Control Protocol connection between the system and the destination and wherein said first window value is a Transmission Control Protocol send window value.

18. The system of claim 17 wherein at least one of the device driver and the network adaptor is adapted to:
- in response to the destination reducing the size of the Transmission Control Protocol send window value to a third quantity less than the second quantity, limit the number of packets sent by said system, but not acknowledged as received by said destination, to a fourth quantity of data packets no greater than the reduced size of the Transmission Control Protocol send window value; and
- store the value of the fourth quantity of data packets in the virtual window field of the associated Protocol Control Block.

19. The system of claim 12, wherein the data storage comprises a magnetic storage medium.

20. An article of manufacture comprising a computer readable storage medium having code executed by a processor for managing data transmission through a network, wherein the article of manufacture causes operations to be performed, the operations comprising:

establishing a plurality of active direct memory access connections between the host and a plurality of destinations;

establishing for each connection a Protocol Control Block, each Protocol Control Block having a first window field, a virtual window field and a message limit field, for the associated connection;

receiving from each destination a first window value representing a first quantity of data packets for the connection associated with the destination, and storing the received first window value in a first window field of the Protocol Control Block associated with the connection;

for each Protocol Control Block, storing the value of a second quantity of data packets in the virtual window field of the Protocol Control Block, wherein the second quantity of each connection is less than the first window field value of the connection and is based, at least in part, on the number of active connections of the host;

sending packets of data from said host to each destination;

receiving an acknowledgment from each destination for each packet of data received by each destination wherein the first window value of each connection represents a limit imposed on said host by the destination of the connection on the quantity of data packets sent from said host to the destination of the connection and lacking an acknowledgment of being received by the destination of the connection; and limiting the number of packets sent by said host to each connection, but not acknowledged as received by the destination of each connection, to the value of the virtual window field of the Protocol Control Block associated with the connection, wherein the value of the virtual window field of the Protocol Control Block associated with the connection is less than the value of the first window field of the Protocol Control Block associated with the connection;

sending a plurality of messages to specified memory locations of the destinations of the direct memory access connections wherein each message comprises a plurality of data packets;

receiving message acknowledgments, each message acknowledgment being sent by a destination for each message received by the destination; and for each connection, establishing a message limit and storing the value of the message limit in the message limit field of the Protocol Control Block associated with the connection; and for each connection, limiting the number of messages sent by said host through the connection, but not acknowledged as received by the destination of the connection, to the value of the message limit field of the Protocol Control Block associated with the connection so that each message limit imposes a separate limit for each direct memory access connection on the quantity of messages sent from said host to the specified memory location of the direct memory access connection associated with the message limit and lacking a message acknowledgment of being received by the destination of the direct memory access connection associated with the message limit, each message limit providing a further limit on the associated connection in addition to the packet limit imposed by the value of the virtual window field of the Protocol Control Block associated with the connection.

21. The article of manufacture of claim 20, wherein each direct memory access connection includes a network interface between an application of said host and a network connecting the host to the plurality of destinations and wherein said network interface includes a queue for each direct memory access connection and adapted to queue messages to be sent through the direct memory access connection associated with each queue, and wherein said each sending of a message to specified memory location of the destination of a direct memory access connection includes queuing the message in the network interface queue associated with the direct memory access connection; and wherein the queuing of messages in the network interface queue associated with a direct memory access connection is suspended when the quantity of messages sent from said host to the specified memory location of the associated direct memory access connection and lacking a message acknowledgment of being received by the destination of the associated direct memory access connection reaches the separate message limit imposed on the direct memory access connection associated with the network interface queue.

22. The article of manufacture of claim 21, wherein the queuing of messages in the network interface queue associated with a direct memory access connection is resumed when the quantity of messages sent from said host to the specified memory location of the associated direct memory access connection and lacking a message acknowledgment of being received by the destination of the associated direct memory access connection is less than the separate message limit imposed on the direct memory access connection associated with the network interface queue.

23. The article of manufacture of claim 22 wherein each active direct memory access connection includes a Transmission Control Protocol connection between the host and the destination and wherein said first window value is a Transmission Control Protocol send window value and wherein each direct memory access connection is a Remote Direct Memory Access connection between the host and the destination of the direct memory access connection and each message is a Remote Direct Memory Access message.

24. The article of manufacture of claim 23 wherein said network interface has a pool of empty messages which imposes a limit on the total quantity of messages sent from said host to all the specified memory locations of all the direct memory access connections and lacking a message acknowledgment of being received by the destination of the associated direct memory access connection and wherein each message limit is less than the network interface pool of empty messages.

25. The article of manufacture of claim 20 wherein each active direct memory access connection includes a Transmission Control Protocol connection between the host and the destination and wherein said first window value is a Transmission Control Protocol send window value.

26. The article of manufacture of claim 25, wherein the operations further comprise:

in response to the destination reducing the size of the Transmission Control Protocol send window value to a third quantity less than the second quantity, limiting the number of packets sent by said host, but not acknowledged as received by said destination, to a fourth quantity of data packets no greater than the reduced size of the Transmission Control Protocol send window value; and storing the value of the fourth quantity of data packets in the virtual window field of the associated Protocol Control Block.

27. The article of manufacture of claim 20 further comprising changing the size of a message limit of an active direct memory access connection prior to sending at least one message through the associated direct memory access connection.

28. The article of manufacture of claim 27 wherein each message limit is based, at least in part, on the number of active direct memory access connections of the host.

29. The article of manufacture of claim 20 wherein each message limit is based, at least in part, on the number of active direct memory access connections of the host.

30. The article of manufacture of claim 20 further comprising changing the size of the second quantity of packets limiting the number of packets sent by the host but not acknowledged as received by the destination prior to sending at least one packet.

* * * * *